No. 691,507. Patented Jan. 21, 1902.
C. UPTON.
FRICTION CLUTCH.
(Application filed Mar. 9, 1901.)
(No Model.)
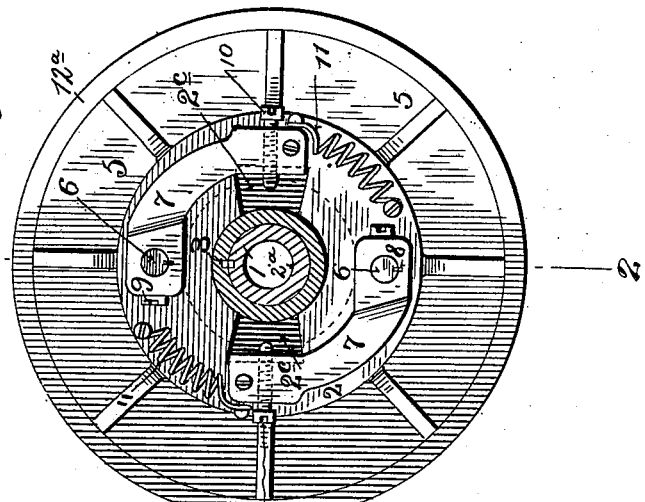
Witnesses
C. W. Benjamin
M. Manning
Inventor
Colcord Upton
by P. F. Bourne
his atty

UNITED STATES PATENT OFFICE.

COLCORD UPTON, OF BEVERLY, MASSACHUSETTS, ASSIGNOR TO THE UPTON MACHINE COMPANY, A CORPORATION OF NEW YORK.

FRICTION-CLUTCH.

SPECIFICATION forming part of Letters Patent No. 691,507, dated January 21, 1902.

Application filed March 9, 1901. Serial No. 50,506. (No model.)

*To all whom it may concern:*

Be it known that I, COLCORD UPTON, a citizen of the United States, residing at Beverly, Massachusetts, have invented certain new and useful Improvements in Friction-Clutches, of which the following is a specification.

My invention relates to improved means for connecting rotative parts frictionally, to the end that by a relatively slight movement of the friction setting or actuating elements a very strong or firm uniting of the parts frictionally can be effected.

The invention consists in the novel details of improvement that will be more fully hereinafter set forth and then pointed out in the claims.

Reference is to be had to the accompanying drawings, forming part hereof, wherein—

Figure 1 is a face view of my improvements, partly in section, on the plane of the line 1 1 in Fig. 2. Fig. 2 is a central section thereof on the plane of the line 2 2 in Fig. 1. Fig. 3 is an end view of the actuating sleeve or cam. Fig. 4 is a side view thereof, and Fig. 5 is a similar view at right angles to Fig. 4.

In the accompanying drawings, in which similar numerals of reference indicate corresponding parts of the several views, 1 indicates a suitable shaft, which may be supported in suitable bearings, and said shaft is provided with an extension or support 2, shown in the form of a dish secured to the shaft, as by a key 3, and also shown provided with a hub $2^a$. Support 2 is held from moving longitudinally along shaft 1, as by a pin $2^b$, passing through said shaft and through hub $2^a$.

4 is a sleeve or clutch actuator provided with cam-surfaces $4^a$ and adapted to slide longitudinally along shaft 1, being shown mounted upon hub $2^a$ and keyed thereto, as by a key $4^b$, so as to rotate therewith. It is evident, however, that the hub $2^a$ need not pass through the bore in sleeve 4, in which event said sleeve may be mounted directly upon shaft 1 and keyed thereto so as to slide thereon.

5 is a disk or plate mounted to rotate freely around shaft 1, and 6 is a screw or threaded rod having right and left threads $6^a$, which mesh in corresponding parts 2 and 5, (see Fig. 2,) and by preference the threads $6^a$ should be relatively coarse, whereby as screw 6 is rotated the disk 5 will be moved quickly, the right and left threads having the effect to move disk 5 a relatively large distance for a comparatively small rotation of the screws. Each screw or threaded rod 6 is provided with an arm 7, that passes over or in line with shaft 1 and adapted to be moved outwardly by the sleeve 4 and its cams to cause the screws 6 to move disk 5 away from support 2. I have shown the arms 7 secured to screw 6 by keys 8 and screws 9. The free ends of the arms 7 are shown provided with adjusting-screws 10, which may be of suitable construction and adapted to be engaged by the projections $4^a$ and the sleeve 4, whereby by adjusting screws 10 toward or from the shaft more or less movement of the arms 7 can be effected by the sleeve 4.

11 represents springs secured, respectively, to the free ends of the arms 7 and to the disk 2 and serving to draw the arms toward shaft 1. It will thus be seen that shaft 1, support 2, and disk 5 are so connected as to rotate in unison, and yet disk 5 has movement along the shaft by means of the screw 6.

12 is a disk mounted to rotate freely around shaft 1 and arranged complementary with disk 5, and the disk 12 is shown provided with an annular flange $12^a$, encircling disk 5, whereby to exclude dust, &c., from between disks 5 and 12.

13 is a friction-washer between disks 5 and 12. Disk 12 is maintained from sliding along shaft 1, although, as before stated, it may rotate independently thereof, and for this purpose I have shown an abutment 14 upon shaft 1. The part 12 when united to shaft 1 by the devices described may communicate motion to the part to be driven, or disk 12 may be rotated by a driver to communicate rotation through said devices to shaft 1. I have shown a toothed wheel 15, connected to disk 12, which may communicate motion to a part to be driven or may have motion communicated to it by a driver.

The operation of my improvements may be described as follows: When the sleeve 4 is not pressing the arms 7 outwardly, the disks 5 and 12 are free to rotate independently, so that if shaft 1 is rotated disk 12 will not be rotated thereby, and, vice versa, if disk 12 be driven shaft 1 will not be rotated thereby. When sleeve 4 is pushed under the arms 7, the latter will rotate the screws or threaded rods 6, whereby disk 5 will be caused to frictionally join the parts 1 and 2 with the disk 12, and thus the driving and driven parts (1 and 12) will be rotatively united. As the surface of the projections or extensions 4ª is beveled or cam-like, the more they are pushed under the arms 7 the more will be the frictional contact between the parts 5 and 12, and thus by pushing the projections 4ª and sleeve 4 more or less under the arms 7 the frictional connection between the driving and driven parts can be regulated, whereby they may be driven at equal speed and the friction may be allowed to slip as much as desired.

Instead of having the cam-like end of sleeve 4 completely annular in well-known manner I have shown the projections 4ª and apertures 2ᶜ in the disk 2 to receive said projections, so that the main part 4ᵇ of sleeve 4 can pass under arms 7 when the full amount of friction between parts 5 and 12 is to be utilized.

By having the part 2 that is secured to the shaft and the screw 6 provided with right and left threads to mesh in threads in the parts 2 and 5 a relatively slight rotation of the screw will impart considerable movement laterally to disk 5 to move the latter toward disk 12, and thereby a relatively small movement of arm 7 will cause a quick and firm frictional engagement between the parts 5 and 12 and a likewise quick release of the parts 5 and 12. The advantage of this will be apparent when the clutch is used in an automobile between the main driving and driven members, whereby a quick and firm connection can be made between said members and a very quick release thereof by a relatively slight movement of the clutch-actuator 4, and, further, as the friction-faces of the disks 5 and 12 are radially disposed a relatively large frictional surface is provided in a comparatively small space.

I do not limit my invention to the precise details of improvement shown and described, as they may be varied without departing from the spirit thereof.

Having now described my invention, what I claim is—

1. In a friction-clutch, the combination of a driving part, a driven part, a disk connected therewith, a disk to frictionally connect with the first-mentioned disk and having lateral movement, a support rigidly connected with one of said parts, a screw having right and left threads meshing in corresponding threads in the laterally-movable friction-disk and in said support, and means for operating said screw for frictionally connecting the driving and driven parts, said disks having substantially parallel radially-extending coacting faces, substantially as described.

2. The combination of a shaft, a support rigidly connected therewith, a disk movable independently of the shaft, a screw having right and left threads rotatively connecting said support and disk, means for operating said screw, a friction-disk movable independently of the shaft, and means to limit the lateral movement of said disk when the first-mentioned disk is pressed toward the latter, substantially as described.

3. The combination of a shaft, a support rigidly connected therewith, a friction-disk movable independently along the shaft, a screw rotatively connecting said support and disk and having right and left threads meshing respectively in corresponding threads in said support and disk, a second friction-disk to coact with the first-mentioned disk and mounted to rotate freely upon said shaft, and means to limit the movement of said disk along said shaft, substantially as described.

4. The combination of a shaft, a support rigidly connected therewith, a friction-disk movable independently along said shaft, a screw rotatively connecting said support and disk, a second friction-disk mounted to rotate freely upon said shaft and provided with an annular flange encircling the first-mentioned disk, and means to limit the movement of the second-mentioned disk along the shaft, substantially as described.

5. The combination of a shaft having a support, a friction-disk movable independently along said shaft, a screw connecting said support and disk to move the latter along the shaft and to rotate one by the other, an arm connected with said screw, a sleeve to operate said arm, a spring to move the free end of the arm toward the shaft, a second friction-disk supported by and rotative independently of the shaft, and means for limiting the movement of said disk along the shaft, substantially as described.

6. The combination of a shaft, a support secured thereto and provided with an opening, a sleeve mounted to slide longitudinally of said shaft and provided with a projection adapted to enter said opening, a friction-disk movable along said shaft, a screw connecting said support with said disk, an arm connected with said screw and adapted to be operated by said sleeve, a second friction-disk rotative independently of the shaft, and means to limit movement of said disk along the shaft, substantially as described.

COLCORD UPTON. [L. S.]

Witnesses:
BYRON W. FELLOWS,
SAMUEL H. STONE.